United States Patent
Gonzalez Macias et al.

(10) Patent No.: US 12,174,694 B2
(45) Date of Patent: *Dec. 24, 2024

(54) DETECTING SYSTEM EVENTS BASED ON USER SENTIMENT IN SOCIAL MEDIA MESSAGES

(71) Applicant: Capital One Services, LLC, McLean, VA (US)

(72) Inventors: Vannia Gonzalez Macias, Glen Allen, VA (US); Paul Cho, Astoria, NY (US); Rahul Gupta, Midlothian, VA (US); Scott Garcia, Washington, DC (US); Adithya Ramanathan, Old Bridge, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,310

(22) Filed: Jan. 17, 2024

(65) Prior Publication Data

US 2024/0152419 A1   May 9, 2024

Related U.S. Application Data

(63) Continuation of application No. 18/152,590, filed on Jan. 10, 2023, now Pat. No. 11,914,462, which is a continuation of application No. 17/239,342, filed on Apr. 23, 2021, now Pat. No. 11,579,958.

(51) Int. Cl.
| | |
|---|---|
| *G06F 11/07* | (2006.01) |
| *G06F 40/289* | (2020.01) |
| *G06F 40/30* | (2020.01) |
| *G06N 20/00* | (2019.01) |

(52) U.S. Cl.
CPC ........ *G06F 11/0781* (2013.01); *G06F 40/289* (2020.01); *G06F 40/30* (2020.01); *G06N 20/00* (2019.01)

(58) Field of Classification Search
CPC .... G06N 20/00; H04L 12/1827; G06Q 50/01; G06F 40/284
See application file for complete search history.

(56) References Cited

U.S. PATENT DOCUMENTS

| | | | |
|---|---|---|---|
| 2020/0304364 A1* | 9/2020 | Tapia | ........................ G06N 7/01 |
| 2023/0078661 A1* | 3/2023 | Wei | ..................... G06F 16/3347 |
| | | | 709/223 |

* cited by examiner

*Primary Examiner* — Matthew M Kim
*Assistant Examiner* — Matthew N Putaraksa
(74) *Attorney, Agent, or Firm* — Foley & Lardner LLP

(57) ABSTRACT

Methods and systems are disclosed herein for using anomaly detection in timeseries data of user sentiment to detect incidents in computing systems and identify events within an enterprise. An anomaly detection system may receive social media messages that include a timestamp indicating when each message was published. The system may generate sentiment identifiers for the social media messages. The sentiment identifiers and timestamps associated with the social media messages may be used to generate a timeseries dataset for each type of sentiment identifier. The timeseries datasets may be input into an anomaly detection model to determine whether an anomaly has occurred. The system may retrieve textual data from the social media messages associated with the detected anomaly and may use the text to determine a computing system or event associated with the detected anomaly.

20 Claims, 8 Drawing Sheets

400

[{'timestamp': '2021-02-22 10:00:00', 'label': 'positive', 'count': 4, 'duration': 10}, {'timestamp': '2021-02-22 10:00:00', 'label': 'negative', 'count': 4, 'duration': 10}, {'timestamp': '2019-02-05 10:00:00', 'label': 'neutral', 'count': 0, 'duration': 10}]

FIG. 4

| Text | Timestamp | Anomaly ID | Sentiment | Computer System |
|---|---|---|---|---|
| LOOK WHAT CAME INTO THE MAIL TODAY MY CAPITAL ONE BLANKET IM OBSESSED ITS SO SOFT AND COZY | 10:03AM 02.22.2021 | 1 | Positive, happy, excited | System A |
| Wow! Capital One's new logo is sooo cool | 10:05AM 02.22.2021 | 2 | Positive, happy | System A |
| The capital one app is not working on my smartphone ☹☹☹ | 10:06AM 02.22.2021 | 3 | Negative, sad | System B |
| Jeepers creepers! Why Can't I log in to capital one???! | 10:08AM 02.22.2021 | 4 | Negative, angry | System C |

FIG. 5

DETECTING SYSTEM EVENTS BASED ON USER SENTIMENT IN SOCIAL MEDIA MESSAGES

CROSS-REFERENCE TO RELATED APPLICATION(S)

This application is a continuation of U.S. patent application Ser. No. 18/152,590, filed Jan. 10, 2023, which is a continuation of U.S. patent application Ser. No. 17/239,342, filed Apr. 23, 2021. The content of the foregoing application is incorporated herein in its entirety by reference.

BACKGROUND

In the last few years, computing environments have grown at astronomical rates, making it more and more difficult to detect and diagnose issues. To address this difficulty, complex monitoring and alerting systems have been built and are available to enterprises. Generally, those systems monitor the computing environment and send alerts to engineers and administrators when things break. However, even with those systems it may be difficult to identify and diagnose issues, for example, because it may be difficult to determine what an alert means, what the underlying issue is, and/or how to fix the issue. In addition, a computing environment may generate many (e.g., hundreds, thousands, etc.) alerts daily. Some alerts may be minor warnings and may not be as important as other alerts that indicate more critical errors/problems. Thus, it may also be difficult to determine which alerts or issues should be addressed right away.

SUMMARY

Methods and systems are described herein for detecting incidents (e.g., errors, events, etc.) in computing systems.

To address these and other issues, computing systems may use social media messages, for example, received from third party computer systems to identify issues and events in a computing environment. Users may post messages to one or more social media accounts associated with an enterprise (e.g., a Twitter® account and/or a Facebook® account) that describe an issue (e.g., complain about an issue) they are experiencing with an organization's computing system. For example, a user may complain on social media that they are unable to login to a website or access certain data on a mobile application. The social media messages may be received by a computing system associated with the enterprise and may be aggregated based on a timestamp associated with each message. For example, each message that was published within a time window (e.g., 5 minutes, 10 minutes, 3 hours, 1 day, or any other time window) may form a group. Each group may be combined into an entry such that a timeseries dataset is generated based on many groups. The timeseries dataset may be used to determine whether a system issue or another event occurred in the enterprise by performing anomaly detection on the dataset. For example, an anomaly may indicate that there is an unusually large number of people having issues with a computing system, software application, website, or other service. The text from one or more social media messages associated with a detected anomaly may indicate what service, component, device, etc. is having a problem. An anomaly detection system may be able to use this data to generate an alert to send to the appropriate monitoring system (e.g., so that it can properly notify a user to fix the issue). An anomaly detection system may also be able to use the data to determine an appropriate priority level for an alert associated with the issue. For example, if the issue is affecting certain target users or a large number of users of the system, it may be helpful to raise the priority of an alert associated with the issue so that it is addressed more quickly. The anomaly detection system may be implemented as one or more services. For example, the anomaly detection system may include an anomaly detection service and/or a sentiment analysis service for analyzing the social media messages. Each service may be accessible via an application programming interface (API) by other computing systems.

Additionally or alternatively, an anomaly detection system may be able to notify a computing system when something is working well. For example, if there is an update to a user interface, users may post messages to their social media accounts saying how much they enjoy the new user interface. Users may otherwise use social media to state their opinion about various products offered by the organization. For example, a user may publish a message indicating that the user likes a new logo. A system may use social media messages, sentiment analysis, and/or anomaly detection to determine a positive anomaly in social media. The text of the social media messages corresponding to the positive anomaly may indicate what contributed to the positive anomaly. For example, one or more messages may indicate that the user interface for a new website is very easy to use and/or runs faster than before. As an additional example, an anomaly detection system may be able to determine the effect a change in a computing system is having on users. For example, the anomaly detection system may use social media to determine that a user interface change makes it easier for users to perform tasks using the organization's software. Methods and systems described herein may enable a computing system to work more efficiently because when problems arise the computing system may be able to determine what the problem is and/or how to fix it more quickly. The computing system may also be able to better prioritize what should be fixed (e.g., a problem that affects many users should be fixed before a problem that does not affect as many users, or a problem that is so frustrating that users post to social media may be an indication that an alert associated with the problem should have its priority raised, etc.).

An anomaly detection system may receive social media messages that include a timestamp indicating when each message was published. The system may generate, using a sentiment detection model, sentiment identifiers for the social media messages. For example, the sentiment identifiers may include a negative sentiment identifier, a positive sentiment identifier, and/or a neutral sentiment identifier. The system may use the sentiment identifiers, timestamps, and/or social media messages to generate a timeseries dataset for each type of sentiment identifier (e.g., a timeseries dataset for the positive sentiment identifier, a timeseries dataset for the negative sentiment identifier, etc.). The timeseries dataset may be input into an anomaly detection model to determine whether an anomaly has occurred in the social media messages (e.g., the anomaly may indicate that there is an issue with a computing system). The system may retrieve textual data from the social media messages associated with the detected anomaly. For example, if many users begin publishing messages on social media stating that a feature of a website is not working, the anomaly detection system may be able to use the text to determine a computing system to which an alert should be sent, so that the issue may be resolved.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 4 shows an example dataset that may be generated and used for anomaly detection, in accordance with some embodiments.

FIG. 5 shows an example dataset that may be used for determining a computing system to which an alert should be sent.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
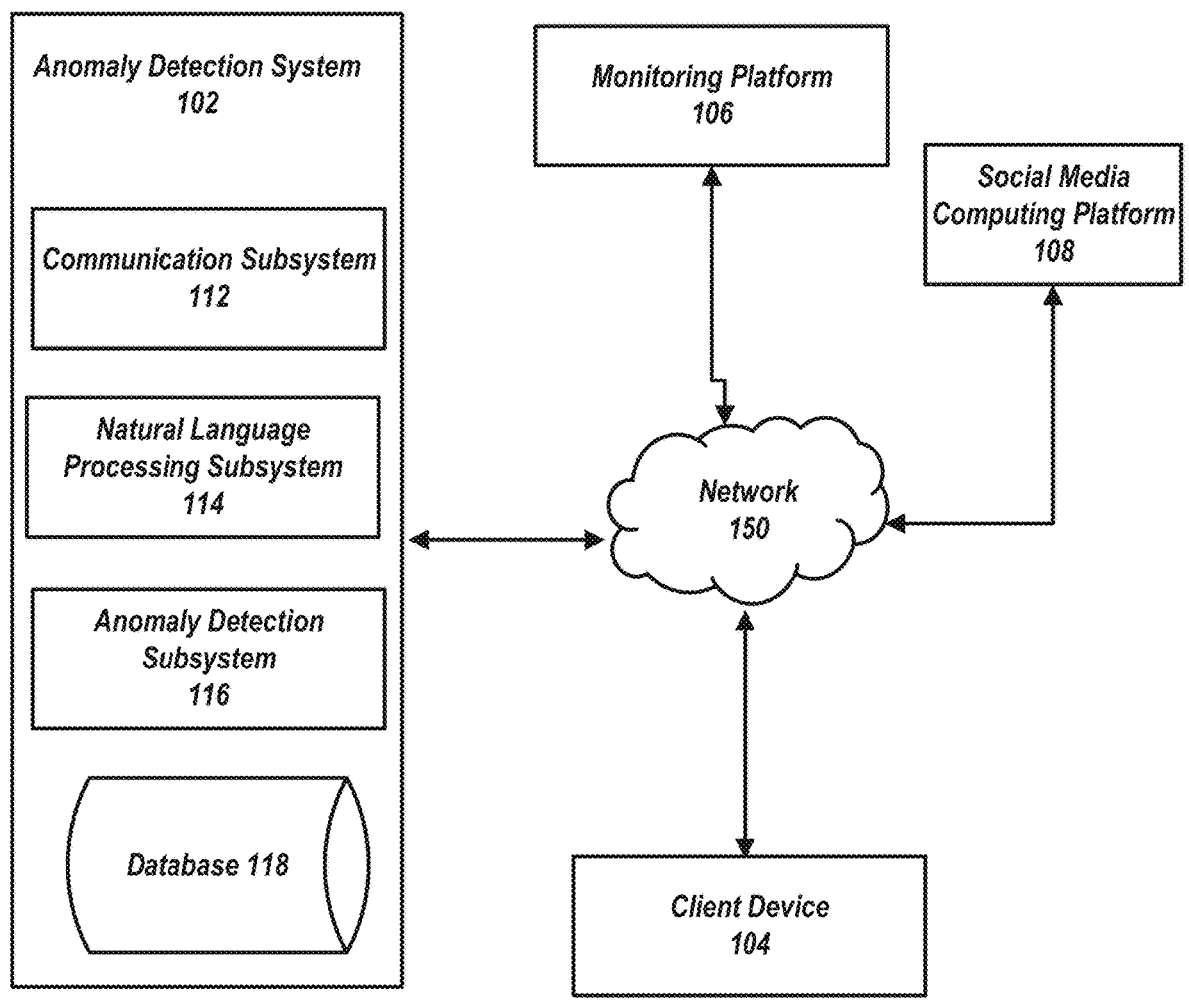
FIG. 1 shows an example anomaly detection system for detecting events in computing systems, in accordance with some embodiments.

FIG. 1 shows an example computing system 100 for detecting incidents or anomalies in computing systems. For example, the system 100 may use messages (e.g., social media messages, chat messages, enterprise communication messages (e.g., hangouts, slack, etc.), call audio recordings (e.g., from a call center or customer service center), or any other type of message) and anomaly detection to identify one or more computing systems that are associated with an anomaly based on negative sentiment values (e.g., indicating that a computing system may be experiencing errors or other problems). Additionally or alternatively, the system 100 may be used to identify software, hardware, computing systems, or other components that are associated with an anomaly based on positive sentiment values. The system 100 may include an anomaly detection system 102, a client device 104, a monitoring platform 106, and/or a social media platform 108.

The client device 104 may be any computing device, including, but not limited to, a laptop computer, a tablet computer, a hand-held computer, smartphone, other computer equipment (e.g., a server or virtual server), including "smart," wireless, wearable, and/or mobile devices. The client device may be used to send a message or post to the social media computing platform 108. Although only one client device 104 is shown, the system 100 may include any number of client devices, which may be configured to communicate with the social media computing platform 108 via the network 150 (e.g., to send social media messages, or other communications). The social media computing platform 108 may receive social media messages from the client device 104 and may publish them (e.g., on a website or other application accessible via the Internet). Additionally or alternatively, the social media computing platform 108 may send social media posts to the anomaly detection system 102 (e.g., in response to a query received from the anomaly detection system 102). The social media computing platform and/or the monitoring platform may include one or more servers or other computing devices. A social media message may include any portion of text that is shared with people via the Internet or other computer network. For example, a social media message may include a blog post, a comment (e.g., on a website, social media post, or other application, etc.), a discussion board or discussion forum accessible via the Internet, a message on a shopping network, a message on an anonymous social network, etc. A social media message may include a message or post that is shared, posted, or otherwise published, for example, on Facebook®, Twitter®, LinkedIn®, Instagram®, Snapchat®, YouTube®, Reddit®, Quora®, Digg®, Pinterest®, Flipboard®, Yelp®, Tumblr®, Etsy®, etc.

A social media message may include internal communication channels used by businesses or enterprises (e.g., Hangouts®, Slack®, Microsoft Teams®, etc.). For example, employees of a company may communicate about positive or negative issues regarding one or more computing systems. A social media message may include call audio recordings from a call center (e.g., an audio recording of a user that has called a customer service line of a company). The audio recordings may be converted to text for use by the computing system 100.

The monitoring platform 106 may include one or more computing devices configured to monitor other computing systems or computing devices. The monitoring platform may determine a priority level (e.g., low, medium, high) to assign to an alert, and may send the alert to an appropriate computing system associated with the alert. The alert may indicate that a computing system is experiencing an error. For example, the alert may indicate that a particular application is not working as expected, a computing system has not generated a log file as expected, a computing system is unable to be detected, or any other issue. The monitoring platform 106 may receive alerts from any application, system, component, etc. that is used in an organization (e.g., enterprise company, business, government, etc.). The alerts may be overwhelming to an operations management team and it may be difficult for the team to understand the importance or impact of a condition underlying an alert. Using messages to determine the priority level of an alert may allow the monitoring system and/or team to address more important issues in a more efficient manner.

The anomaly detection system 102 may be configured to use anomaly detection in social media messages or other communication channels both internal or external to detect issues or malfunctions in one or more computing systems (e.g., computing systems that are monitored by the monitoring platform 106). The anomaly detection system 102 may include one or more computing devices described above and/or may include any type of mobile terminal, fixed terminal, or other device. For example, the anomaly detection system 102 may be implemented as a cloud computing system and may feature one or more component devices. A person skilled in the art would understand that system 100 is not limited to the devices shown. Users may, for example, utilize one or more other devices to interact with devices, one or more servers, or other components of system 100. A person skilled in the art would also understand that, while one or more operations are described herein as being performed by particular components of the system 100, those operations may, in some embodiments, be performed by other components of the system 100. As an example, while one or more operations are described herein as being performed by components of the anomaly detection system 102, those operations may be performed by components of the client device 104, monitoring platform 106, and/or social media computing platform 108. In some embodiments, the various computers and systems described herein may include one or more computing devices that are programmed to perform the described functions. Additionally or alternatively, multiple users may interact with system 100 and/or one or more components of system 100. For example, a first user and a second user may interact with the anomaly detection system 102 using two different client devices.

One or more components of the anomaly detection system 102, client device 104, the monitoring platform 106, and/or the social media computing platform 108, may receive content and/or data via input/output (hereinafter "I/O") paths. The one or more components of the anomaly detection system 102, the client device 104, the monitoring platform 106, and/or the social media computing platform 108 may include processors and/or control circuitry to send and receive commands, requests, and other suitable data using the I/O paths. The control circuitry may include any suitable processing, storage, and/or input/output circuitry. Each of these devices may include a user input interface and/or user output interface (e.g., a display) for use in receiving and displaying data. It should be noted that in some embodiments, the anomaly detection system 102, the client device 104, the monitoring platform 106, and/or the social media computing platform 108 may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to using machine learning and social media data to detect anomalies associated with one or more computing systems.

One or more components and/or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a public switched telephone network, a combination of these networks, or other types of communications networks or combinations of communications networks. The devices in FIG. 1 (e.g., the anomaly detection system 102, the client device 104, the monitoring platform 106, and/or the social media computing platform 108) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, and/or firmware components operating together. For example, the anomaly detection system 102, any component of the anomaly detection system (e.g., the communication subsystem 112, the natural language processing (NLP) subsystem 114, the anomaly detection subsystem 116, and/or the database 118), the client device 104, the monitoring platform 106, and/or the social media computing platform 108 may be implemented by one or more computing platforms operating together as the computing devices. Any component of the anomaly detection system 102 (e.g., the communication subsystem 112, the natural language processing (NLP) subsystem 114, the anomaly detection subsystem 116, and/or the database 118) may be implemented as a service or a microservice (e.g., in a machine learning platform). For example, a computing system may submit data to the anomaly detection subsystem 116 via an API and the anomaly detection subsystem may send anomaly detection results (e.g., as described in more detail below) back to the computing system.

The anomaly detection system 102 may include a communication subsystem 112. The communication subsystem 112 may allow the anomaly detection system 102 to communicate with the monitoring platform 106, the social media computing platform 108, and/or the client device 104 via the network 150. The communication subsystem 112 may be configured to send requests for social media data to the social media computing platform 108 and receive data in response to the requests. The data may include one or more social media messages. The social media messages may have been published within a particular time period or time window (e.g., within the last 10 minutes, within the last 5 minutes, 1 month ago, or any other time period). Each social media message may include a timestamp indicating a date and/or time when the message was published. The data may include one or more messages internal to an organization (e.g., one or more messages that is published within a company, one or more direct messages that are sent between two users, etc.) Each of the one or more messages internal to an organization may include a timestamp indicating when the message was sent and/or received.

Figure 2:
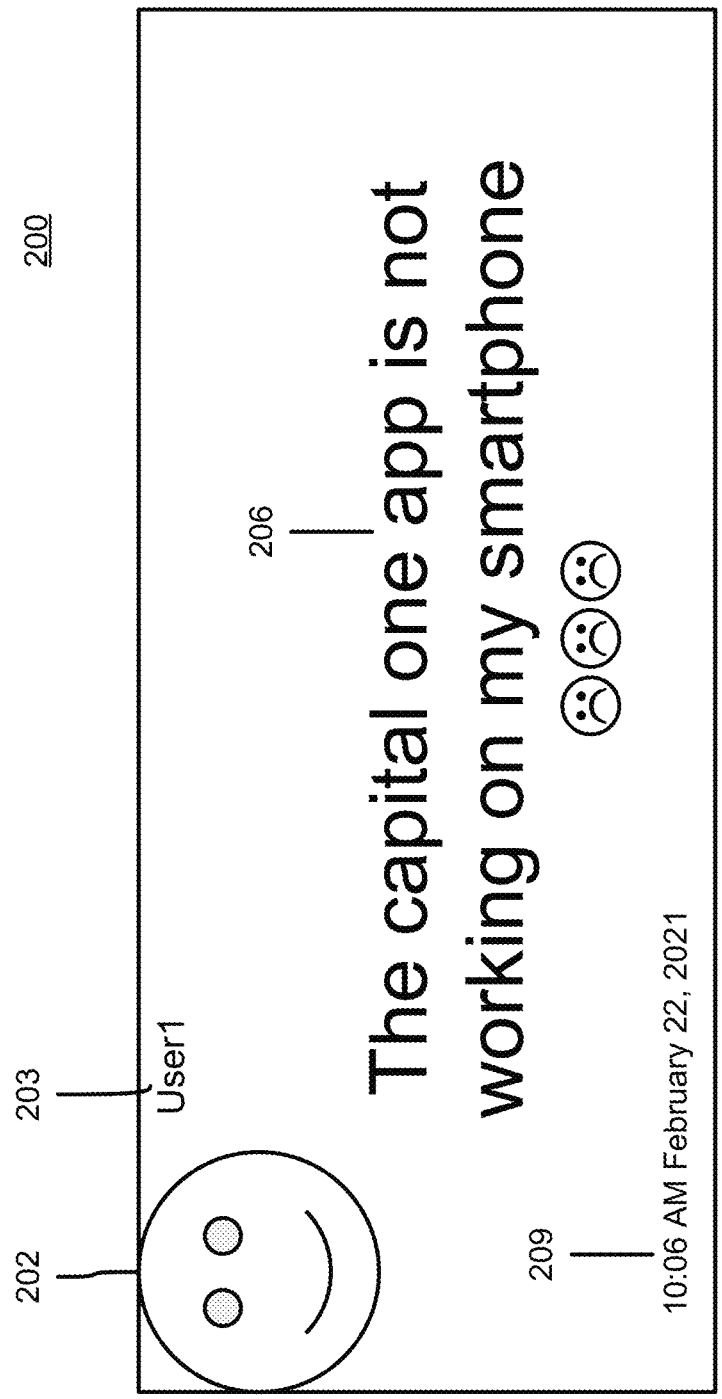
FIG. 2 shows an example social media message, in accordance with some embodiments.

Referring to FIG. 2, an example social media message 200 (e.g., of the one or more social media messages that may be received from the social media computing platform 108) is shown. The social media message 200 may include a user profile picture 202 and a username 203 corresponding to a user that created the message 200. The message 200 may include textual data 206, which may include any text written by the user associated with the username 203. The message 200 may include a timestamp 209 indicating a time at which the message 200 was published. The message 200 may include information indicating an organization, company, computing system, application, or other user that is the subject of the message 200. For example, the textual data may mention the name of a company or organization. Additionally or alternatively the message 200 may use a special character followed by a username of an organization. For example, the text "@CompanyA" may indicate that the message is intended for or otherwise associated with company A. The social media message 200 may also include one or more images, videos, links, emojis, or other data. The social media data may be stored in the database 118.

The communication subsystem 112 may request particular types of social media messages from the social media platform. For example, the communication subsystem 112 may request social media messages that mention or otherwise indicate a particular entity (e.g., the organization, user, company, group, etc. that is associated with the anomaly detection system 102). Social media messages that mention or otherwise indicate the entity associated with the anomaly detection system 102 may be useful in determining whether an anomaly has occurred (e.g., whether an application of the entity is not working correctly, something the entity did recently was helpful for one or more users, etc.). For example, as shown in the textual data 206 of FIG. 2, a message 200 may indicate that a particular application associated with the entity is not working properly. The anomaly detection system 102 may determine that an anomaly has occurred, for example, based on one or more users mentioning the application in a negative context (e.g., as shown by the message 200). The communication subsystem 112 may subscribe to particular types of social media messages (e.g., messages that mention or otherwise correspond to a particular entity). The social media platform 108 may send each new social media message that matches the subscription to the communication subsystem 112 after it is published and/or sent. The communication subsystem 112 may be configured to receive one or more social media messages in batches. For example, the communication subsystem 112 may receive all messages corresponding to its subscription within a time window (e.g., 5 min, 10 min). For example, every 10 min the communication subsystem 112 may receive the messages that match the subscription and were published during the preceding 10 minute window. One or more systems may subscribe and receive messages from the social media platform 108 via an API.

As explained in more detail below, the anomaly detection system 102 may be able to send an alert to a monitoring system (e.g., the monitoring platform 106), associated with the application, indicating that a problem has occurred with the application. This may enable the problem to be resolved more quickly and/or efficiently.

The anomaly detection system 102 may include a natural language processing subsystem 114. The natural language processing subsystem 114 may be configured to generate, via a sentiment detection model, a sentiment identifier for each social media message. The sentiment identifiers may include a negative sentiment identifier, a positive sentiment identifier, and/or a neutral sentiment identifier. The negative identifier may indicate that there is an error with a computing system (e.g., the computing system associated with the social media message to which the negative identifier corresponds). The positive identifier may indicate that an entity associated with the message has done something that a user approves of. For example, a positive identifier may indicate that a user interface is easy to use, a new functionality on a website is helpful to the user, a new product is helpful to the user, and/or any other positive event. The sentiment identifiers may include an indication of emotion. For example, the sentiment identifiers may include happy, sad, angry, frustrated, nervous, or any other emotional identifier. A message may be assigned more than one identifier. For example, a message may be assigned the angry identifier, the frustrated identifier, and the negative identifier.

Figure 3:
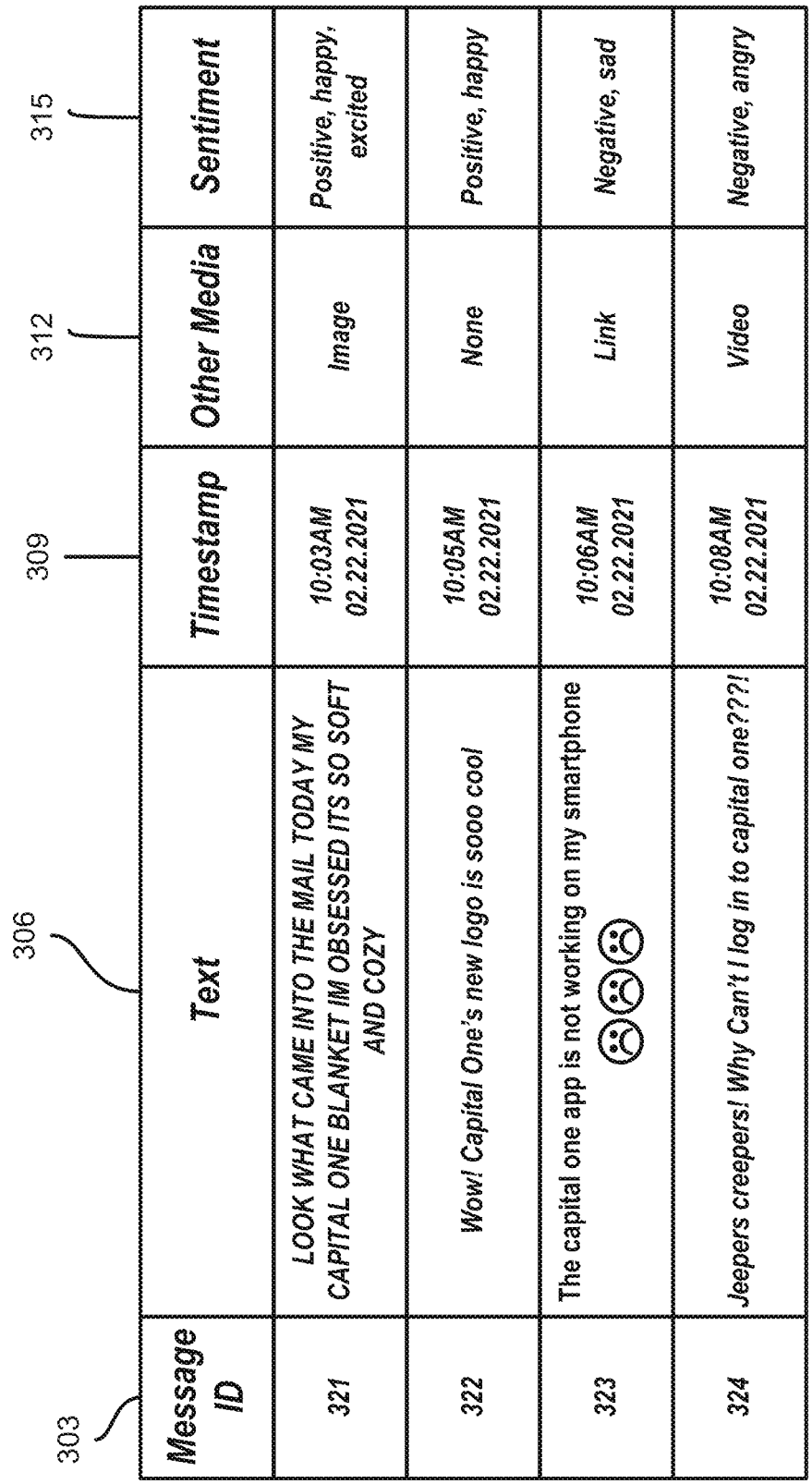
FIG. 3 shows a table with example social media messages and corresponding output from a sentiment detection model, in accordance with some embodiments.

FIG. 3 shows a table with example social media data and corresponding output from a sentiment detection model. The sentiment detection model may have been generated and/or trained by the natural language processing subsystem 114. The example data shown in FIG. 3 may be converted to a time series dataset and input into an anomaly detection model to determine whether an anomaly has occurred (e.g., as discussed in more detail below in connection with FIGS. 4-7).

The social media data may include a message identifier (ID) 303, text 306 (e.g., the textual data 206 of FIG. 2, as described above), a timestamp 309, an indication of other media 312 contained in the message, and a sentiment identifier 315. The timestamp 309 may indicate a date/time when the message was published. The other media 312 may indicate whether the message contained an image, link, or video. Additionally or alternatively, the other media 312 may include a copy of the image, link, or video. The sentiment detection model may use the image, link, or video as input to assist in determining the sentiment of the message. The sentiment identifier 315 may indicate one or more sentiment identifiers that have been determined by the sentiment detection model for the corresponding social media message. For example, the social media message 321 may include the text "LOOK WHAT CAME INTO THE MAIL TODAY MY CAPITAL ONE BLANKET IM OBSESSED ITS SO SOFT AND COZY." The sentiment detection model may label message 321 with the sentiment identifiers positive, happy, and/or excited. As an additional example, the social media message 322 may include the text "Wow! Capital One's new logo is sooo cool." The sentiment detection model may label message 322 with the sentiment identifiers positive and/or happy. As an additional example, the social media message 323 may include the text "The capital one app is not working on my smartphone" with three frowny face emojis. The sentiment detection model may label message 323 with the sentiment identifiers negative and/or sad. As an additional example, the social media message 324 may include the text "Jeepers creepers! Why Can't I log in to capital one???!" The sentiment detection model may label message 324 with the sentiment identifiers negative and/or angry. The sentiment identifiers may be generated using a sentiment detection model, which may be a machine learning model as discussed in more detail below.

The anomaly detection system 102 may include an anomaly detection subsystem 116. The anomaly detection subsystem 116 may be configured to determine, using the social media data (e.g., the textual data, the timestamp, and/or other social media data) and the sentiment identifiers, whether there is an anomaly in the social media data. For example, the anomaly detection subsystem 116 may use an anomaly detection model to determine that an unusually large (e.g., larger than a threshold) number of social media messages have been created within a time period.

The anomaly detection subsystem 116 may use social media data and sentiment identifiers (e.g., generated by the natural language processing subsystem 114) to generate data for input into the anomaly detection model. The anomaly detection subsystem 116 may receive a set of social media messages that were published within a particular time window (e.g., 10 minutes, 3 minutes, etc.) as discussed above in connection with the communication subsystem 112. In some embodiments, the social media data may be aggregated with internal communications (e.g., chat messages, direct messages, other messages that may be internal to an organization) and corresponding sentiment identifiers, and may be input into the anomaly detection model. The anomaly detection subsystem 116 may aggregate or group the received social media messages according to the sentiment identifier generated for each message. For example, there may be a group of social media messages with the negative sentiment identifier, a group of social media messages with the positive sentiment identifier, and/or a group of social media messages with the neutral identifier. Referring to FIG. 4, the anomaly detection subsystem 116 may generate a timeseries dataset 400 using the social media messages and sentiment identifiers. For example, the time series dataset 400 may correspond to social messages generated for the time window 402 that began at 10:00 am and lasted a duration 403 of 10 minutes. The dataset 400 may include an entry for each sentiment identifier corresponding to the time window and may count the number of social media messages that correspond to each sentiment identifier. For example, there may be an entry 401 that indicates that there were four (e.g., as indicated by the label 'count' in the entry 401) social media messages associated (e.g., labeled) with the positive identifier. As an additional example, there may be an entry 410 that indicates that there were four social media messages associated (e.g., labeled) with the negative identifier. As an additional example, there may be an entry 420 that indicates that there were zero social media messages associated (e.g., labeled) with the neutral identifier.

The anomaly detection subsystem 116 may input the timeseries dataset (e.g., the dataset 400) into an anomaly detection model to determine whether one or more anomalies occurred during the time window corresponding to the social media messages (e.g., the time window in which the social media messages were received). The anomaly detection model may be a machine learning model that is generated, trained, and/or used by the anomaly detection subsystem 116.

One or more machine learning models (e.g., the anomaly detection model used by the anomaly detection subsystem 116 and/or the sentiment detection model used by the natural language processing subsystem 114) may take as input a dataset (e.g., one or more social media messages as described in connection with FIGS. 2-3 above, or a time series dataset as described in connection with FIG. 4 above) and provide a plurality of output parameters. The output parameters may include and/or indicate one or more sentiment identifiers that are responsive to a query received by the anomaly detection system 102 (e.g., as described above in connection with FIGS. 2-3). The output parameters may indicate that there is an anomaly, for example, if the machine learning model is the anomaly detection model. The output parameters may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate more accurate sentiment identifiers and/or more accurately detect anomalies in time series data.

In some embodiments, the machine learning model may include an artificial neural network. In such embodiments, machine learning model may include an input layer and one or more hidden layers. Each neural unit of the machine learning model may be connected with one or more other neural units of the machine learning model. Such connections can be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model and an input known to correspond to that classification may be input into an input layer of machine learning model during training During testing, an input without a known classification may be input into the input layer, and a determined classification may be output. For example, a social media message may be input and a sentiment identifier may be output. As an additional example, a time series dataset may be entered and one or more indications of whether an anomaly exists in the dataset may be output.

A machine learning model trained by the natural language processing subsystem 114 and/or the anomaly detection subsystem 116 may include embedding layers at which each feature of a vector (e.g., a vector representing a social media message, a vector representing a timeseries data entry, etc.) may be converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. The machine learning model may include a Bayesian model configured to perform variational inference on one or more datasets (e.g., a dataset including social media messages, a dataset including timeseries data, etc.). The machine learning model may include a bidirectional encoder representations from transformers (BERT) model. The BERT model may be trained (e.g., via supervised learning) on social media message data to determine sentiment identifiers for subsequent social media messages that are input into the BERT model. As an example, the machine learning model may output a value indicating a sentiment identifier. A first sentiment identifier may be determined, for example, if the value is above a first threshold. A second sentiment identifier may be determined, for example, if the value is below a second threshold. A third sentiment identifier may be determined, for example, if the value is below the first threshold and above the second threshold (e.g., the value is between the two threshold values).

The anomaly detection model and the sentiment detection model may be the same machine learning model or separate machine learning models. For example, each model may be trained separately to perform their respective tasks (e.g., sentiment detection and anomaly detection).

The anomaly detection subsystem 116 may use the parameters output by the anomaly detection model to determine whether an anomaly has occurred for each type of sentiment identifier. For example, if a time series dataset includes a data entry corresponding to the positive sentiment identifier and a data entry corresponding to the negative identifier, the anomaly detection subsystem 116 may determine whether there is an anomaly in social media messages associated with the positive sentiment identifier and whether there is an anomaly in social media messages associated with the negative sentiment identifier. Anomaly detection as well as other techniques are described in U.S. patent application Ser. No. 17/239,261, filed on Apr. 23, 2021, and entitled "Automatic Model Selection for a Time Series," which is hereby incorporated herein by reference in its entirety. Other anomaly detection and processing techniques are described in U.S. patent application Ser. No. 17/238,536, filed on Apr. 23, 2021, and entitled "Anomaly Detection Data Workflow for Time Series Data," U.S. patent application Ser. No. 17/238,486, filed on Apr. 23, 2021, and entitled "Anomaly Detection in a Split Timeseries Dataset," and U.S. patent application Ser. No. 17/239,143, filed on Apr. 23, 2021, and entitled "Anomaly detection in Computing System Events," which are hereby incorporated herein by reference in their entireties.

The anomaly detection subsystem 116 may use the detected anomalies to determine whether information (e.g., alerts, notifications, etc.) should be sent to the monitoring platform 106. The anomaly detection subsystem 116 may send an alert to the monitoring platform 106, for example, if there is an anomaly detected in time series data associated with the negative sentiment identifier. The anomaly detection subsystem 116 may determine an event associated with the anomaly and determine a computing system that should be notified. To determine the event, the anomaly detection subsystem 116 may retrieve the social media messages associated with an anomaly. The anomaly detection subsystem 116 may determine, based on the textual data, whether an anomaly is associated with one or more computing systems or software applications. For example, the anomaly detection subsystem 116 may use keywords that are associated with a computing system to determine whether the anomaly is associated with the computing system. The anomaly detection subsystem 116 may compare the keywords with words in the social media messages to determine whether the anomaly is associated with the computing system (or application). For example, if one or more social media messages indicate that there is a problem with logging in to a mobile device application, and the keywords contain one or more matching words (e.g., "login", "mobile device", and/or "application,") the anomaly detection subsystem 116 may determine that the anomaly is associated with a computing system responsible for login and/or a computing system associated with mobile device applications. By identifying the computing system and/or software application associated with the anomaly, the anomaly detection system 102 may be able help software/system issues be resolved more quickly and thus increase the efficiency of one or more computing systems.

Additionally or alternatively, the keywords may correspond to one or more events or actions, or system events. An event may be associated with a positive sentiment identifier. For example, an event may include an update to an application (e.g., a website, mobile application, or other software). An event may include the release of a new logo, an action by a company, press release, or any other type of event. The anomaly detection subsystem 116 may compare keywords associated with an event with words in the social media messages and may determine a computing system (e.g., a communication system) associated with the event. The communication subsystem 112 may send a notification to the determined computing system indicating the anomaly and/or the social media messages.

Additionally or alternatively, the anomaly detection subsystem 116 may train a machine learning model (e.g., a machine learning model as discussed above, a system detection model, etc.) to identify one or more computing systems based on the social media messages associated with an anomaly. For example, the machine learning model may be a supervised model that uses a dataset to train to identify computing systems. Referring to FIG. 5, an example dataset 500 is shown for training a machine learning model to identify computing systems associated with anomalies. The columns may be the features used by the machine learning model. The features may include the text 506 of the social media messages, the timestamps 509, the anomaly ID 512 that each social media message is associated with, and/or the sentiment identifier 515 that each social media message is associated with. The label 520 may indicate the computer system associated with the anomaly and/or social media message. The machine learning model may use the dataset 500 to train to determine a computer system associated with an anomaly. For example, the machine learning model may be trained to determine that computer system B is associated with Anomaly 3 and smartphone apps. For each anomaly, the anomaly detection subsystem 116 may output an indication of one or more associated computing systems.

The communication subsystem 112 may generate a message (e.g., an alert, a notification, etc.) and send the message to the computing system determined by the anomaly detection subsystem 116. The message may include a command and/or data (e.g., textual data) from one or more social media messages associated with the anomaly detected by the anomaly detection subsystem 116. The communication subsystem 112 may send the message to the computing system indicated by the output of the anomaly detection subsystem 116. Additionally or alternatively, the communication subsystem 112 may send the message to a central systems monitoring team that may prioritize the alert, identify the cause of the alert, and/or notify a team associated with the alert (e.g., a team associated with a component that is not working as intended).

The computing system may be a monitoring system (e.g., the monitoring platform 106). The command may cause the monitoring system to correlate the textual data with an alert generated by the monitoring system and modify the alert to raise a priority level of the alert. For example, the monitoring system may perform keyword matching between the text of the social media messages and one or more alerts generated by the monitoring system. Additionally or alternatively, the monitoring system may correlate one or more timestamps and/or metadata associated with the textual data with a timestamp of an alert. For example, if a keyword is "mobile app", the monitoring system may correlate textual data that includes "mobile app" with system events (e.g., alerts) that may be relevant to mobile applications. The message may help the computing system to determine which alerts should have highest priority. For example, if users are complaining about an issue on social media, it may be helpful to raise the priority of the associated alert over other alerts because it may enable the issue to be resolved more quickly. Modifying the priority level of an alert via a message may be used to train a machine learning model (e.g., via reinforcement learning, or supervised learning) to learn to raise priority levels for similar alerts/events.

In some embodiments, the communication subsystem 112 may only send alerts to computing systems and/or services that have subscribed to receive them. The communication subsystem 112 may receive a first alert subscription request from a first software service. The first alert subscription request may indicate a first monitoring system for sending alerts. The anomaly detection system 102 may store the first alert subscription request and a first set of keywords corresponding to the first software service. The communication subsystem 112 may use the keywords to determine (by comparing textual data of the social media messages with the first set of keywords), an anomaly corresponds to the software service. The communication subsystem 112 may generate an alert and send it to the first monitoring system, for example if a match is found between the first set of keywords and the textual data.

Figure 6:
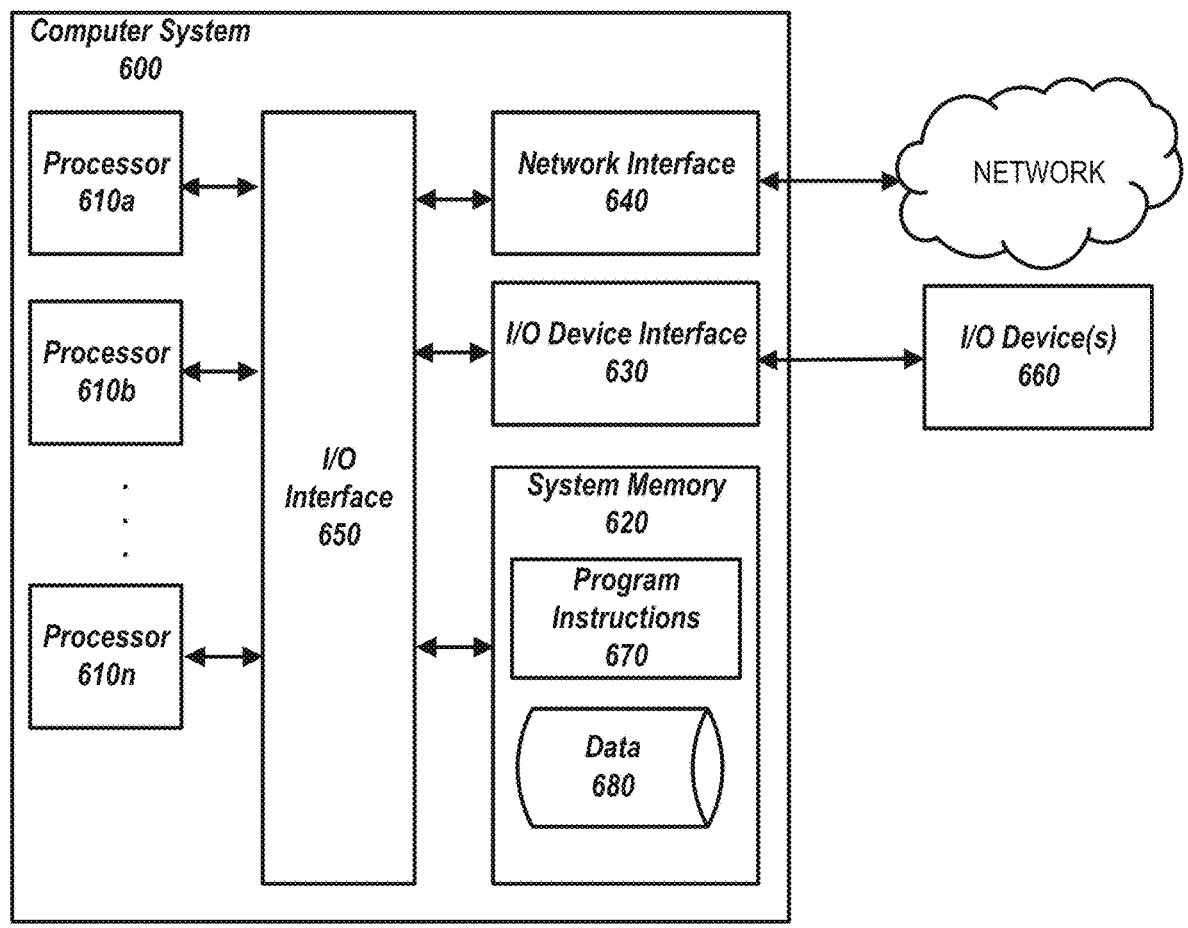
FIG. 6 shows an example computing system that may be used to perform searches on one or more knowledge graphs, in accordance with some embodiments.

FIG. 6 is a diagram that illustrates an exemplary computing system 600 in accordance with embodiments of the present technique. Various portions of systems and methods described herein, may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output I/O device interface 630, and a network interface 640 via an input/output (I/O) interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a units-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer system, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 620 may include a non-transitory computer readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network or a wireless link Various embodiments may further include receiving, sending, or storing instructions or data implemented in accordance with the foregoing description upon a computer-accessible medium. Accordingly, the present disclosure may be practiced with other computer system configurations.

Figure 7:
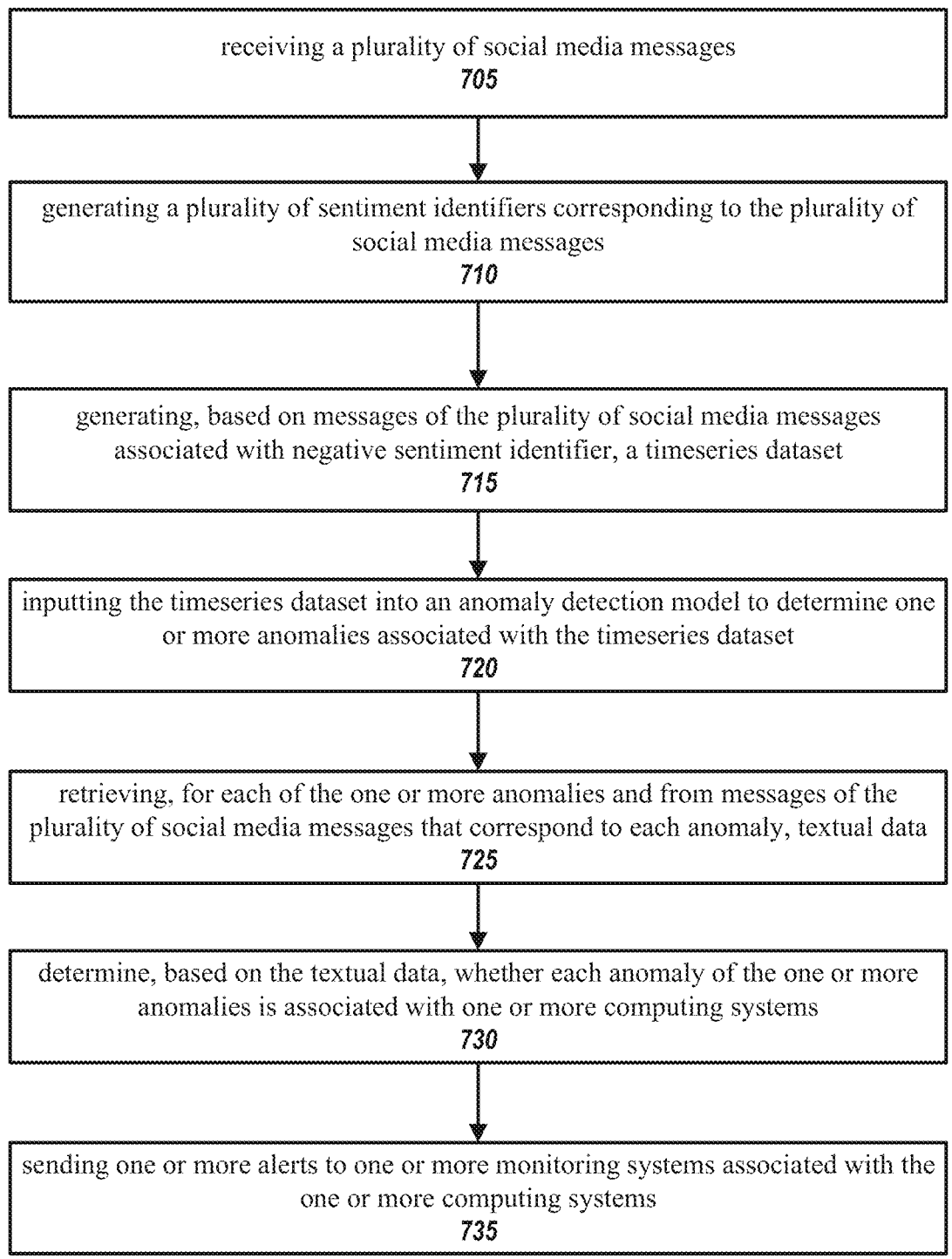
FIG. 7 shows an example flowchart of the actions involved in anomaly detection in timeseries data of user sentiment in social media messages to identify system malfunctions and send alerts, in accordance with some embodiments.

FIG. 7 shows an example flowchart of the actions involved in anomaly detection in timeseries data of user sentiment in social media messages and/or other communication messages to identify system malfunctions and send alerts. For example, process 700 may represent the actions taken by one or more devices shown in FIGS. 1-6 and described above. At 705, anomaly detection system 102 (e.g., using one or more components in system 100 (FIG. 1) and/or computer system 600 via network interface 640 (FIG. 6)) receives a plurality of social media messages. Each message of the plurality of social media messages may comprise a timestamp indicating when each message was published.

At 710, anomaly detection system 102 (e.g., using one or more components in system 100 (FIG. 1) and/or computer system 600 via one or more processors 610a-610n and system memory 620 (FIG. 6)) generates (e.g., via a sentiment detection model) a plurality of sentiment identifiers corresponding to the plurality of social media messages. The plurality of sentiment identifiers may include a negative sentiment identifier, a positive sentiment identifier, and/or a neutral sentiment identifier.

At 715, anomaly detection system 102 (e.g., using one or more components in system 100 (FIG. 1) and/or computing system 600 via one or more processors 610a-610n, I/O interface 650, and/or system memory 620 (FIG. 6)) generates, based on messages of the plurality of social media messages associated with the negative sentiment identifier, a timeseries dataset. The timeseries dataset may include a plurality of entries each having a corresponding timestamp and/or a corresponding degree of negative sentiment.

At 720, anomaly detection system 102 (e.g., using one or more components in system 100 (FIG. 1) and/or computing system 600 via one or more processors 610a-610n (FIG. 6)) inputs the timeseries dataset into an anomaly detection model to determine one or more anomalies associated with the timeseries dataset.

At 725, anomaly detection system 102 (e.g., using one or more components in system 100 (FIG. 1) and/or computing system 600 (FIG. 6)) retrieves (e.g., from data 680), from messages of the plurality of social media messages that correspond to each anomaly, textual data. At 730, anomaly detection system 102 (e.g., using one or more components in system 100 (FIG. 1) and/or computing system 600 via one or more processors 610a-610n (FIG. 6)) determines, based on the textual data, whether each anomaly of the one or more anomalies is associated with one or more computing systems.

At 735, anomaly detection system 102 (e.g., using one or more components in system 100 (FIG. 1) and/or computing system 600 via network interface 640 and/or I/O device interface 630 (FIG. 6)) sends one or more alerts to one or more monitoring systems associated with the one or more computing systems.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-5 could be used to perform one or more of the actions in FIG. 7.

Figure 8:
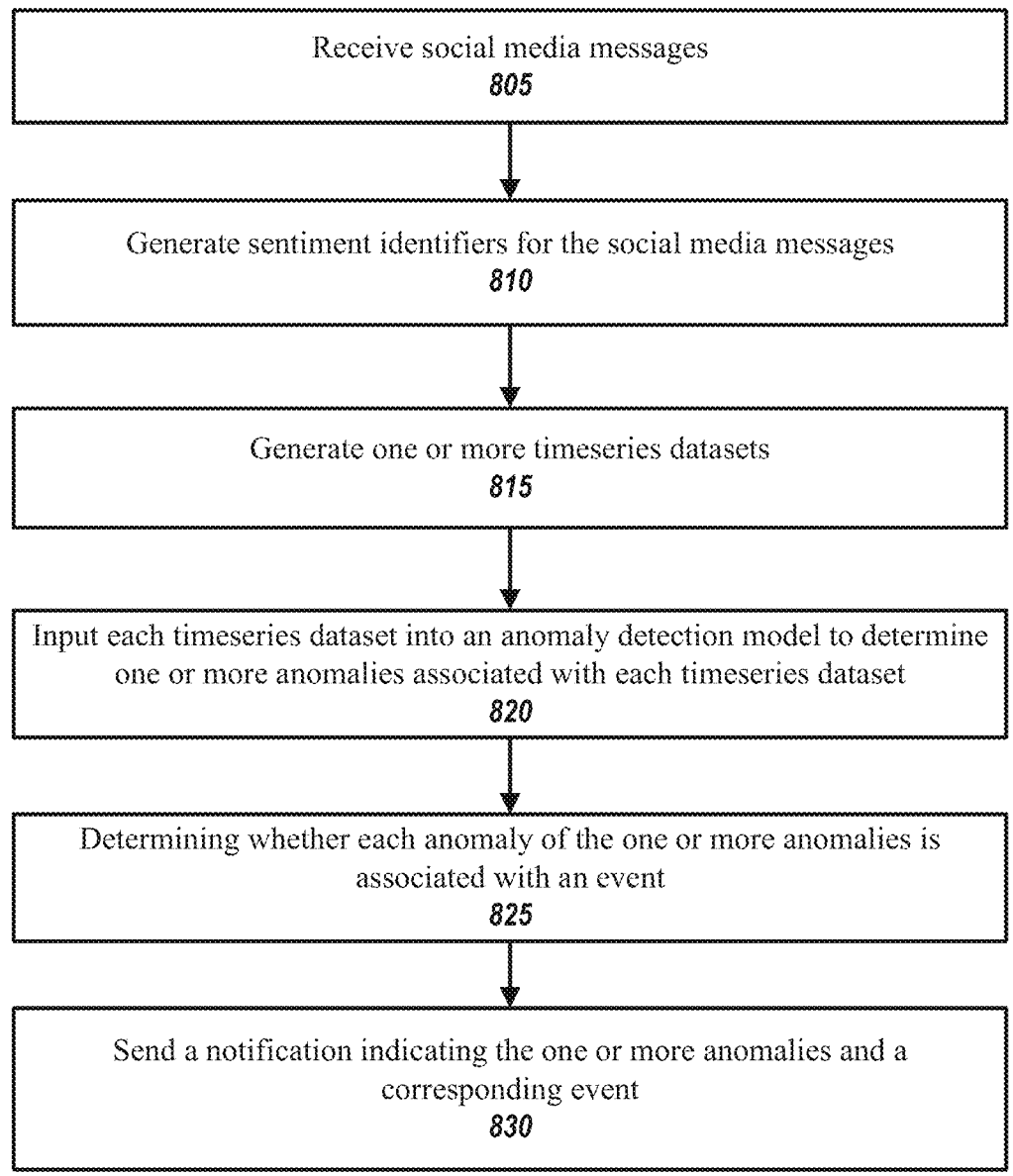
FIG. 8 shows an example flowchart of the actions involved in anomaly detection in timeseries data of user sentiment in social media messages to identify events in an enterprise, in accordance with some embodiments.

FIG. 8 shows an example flowchart of the actions involved in anomaly detection in timeseries data of user sentiment in social media messages to identify events in an enterprise. For example, process 800 may represent the actions taken by one or more devices shown in FIGS. 1-5 and described above. At 805, anomaly detection system 102 (e.g., using one or more components in system 100 (FIG. 1) and/or computing system 600 via network interface 640, I/O devices 660, and/or I/O device interface 630 (FIG. 6)) receives a plurality of social media messages. Each message of the plurality of social media messages may include a timestamp indicating a time at which the message was published.

At 810, anomaly detection system 102 (e.g., using one or more components in system 100 (FIG. 1) and/or computing system 600 via processors 610*a*-610*n* (FIG. 6)) generates (e.g., via a sentiment detection model) a plurality of sentiment identifiers corresponding to the plurality of social media messages.

At 815, anomaly detection system 102 (e.g., using one or more components in system 100 (FIG. 1) and/or computing system 600 (FIG. 6)) generates, for each sentiment identifier of the plurality of sentiment identifiers, a corresponding timeseries dataset. Each timeseries dataset may include a plurality of entries. Each entry of the plurality of entries may include a corresponding timestamp and a corresponding degree of sentiment.

At 820, anomaly detection system 102 (e.g., using one or more components in system 100 (FIG. 1) and/or computing system 600 (FIG. 6)) inputs each timeseries dataset into an anomaly detection model to determine one or more anomalies associated with each timeseries dataset.

At 825, anomaly detection system 102 (e.g., using one or more components in system 100 (FIG. 1) and/or computing system 600 (FIG. 6)) determines, based on the one or more anomalies, whether each anomaly of the one or more anomalies is associated with an event.

At 830, anomaly detection system 102 (e.g., using one or more components in system 100 (FIG. 1) and/or computing system 600 via the network interface 640 (FIG. 6)) sends a notification indicating the one or more anomalies and a corresponding event. The notification may be sent to a computing system and/or a communication system associated with the event.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-5 could be used to perform one or more of the actions in FIG. 8.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a plurality of social media messages; generating a plurality of sentiment identifiers corresponding to the plurality of social media messages; generating a timeseries dataset; inputting the timeseries dataset into an anomaly detection model to determine one or more anomalies associated with the timeseries dataset; retrieving textual data; determining, based on the textual data, whether each anomaly of the one or more anomalies is associated with one or more computing systems; and sending one or more alerts to one or more monitoring systems associated with the one or more computing systems.

2. A method, the method comprising: receiving a plurality of social media messages, wherein each message of the plurality of social media messages comprises a timestamp indicating when each message was published; generating, via a sentiment detection model, a plurality of sentiment identifiers corresponding to the plurality of social media messages; generating, for each sentiment identifier of the plurality of sentiment identifiers, a corresponding timeseries dataset, each timeseries dataset comprising a plurality of entries each comprising a corresponding timestamp and a corresponding degree of sentiment; inputting each timeseries dataset into an anomaly detection model to determine one or more anomalies associated with each timeseries dataset; determining, based on the one or more anomalies, whether each anomaly of the one or more anomalies is associated with an event; and sending a notification indicating the one or more anomalies and a corresponding event.

3. The method of any of the preceding embodiments, further comprising: inputting, into a system detection model, message data extracted from a first message of the plurality of social media messages, wherein the first message is associated with a first timestamp of a first anomaly of the one or more anomalies; and determining, based on output of the system detection model, a corresponding computing system associated with the first anomaly.

4. The method of any of the preceding embodiments, further comprising: generating a list of keywords from a first set of messages of the plurality of social media messages, wherein the first set of messages corresponds to a first anomaly of the one or more anomalies; identifying, based on a comparison of the list of keywords with a list of application names, a first monitoring system of the plurality of monitoring systems; and based on the identifying, sending a first alert of the one or more alerts to the first monitoring system.

5. The method of any of the preceding embodiments, further comprising: sending, based on a first anomaly of the one or more anomalies, a command and the textual data to a first monitoring system, wherein the command causes the first monitoring system to perform operations comprising: correlating the textual data with an alert generated by the monitoring system; and in response to the correlating, modifying the alert to raise a priority level of the alert.

6. The method of any of the preceding embodiments, further comprising: receiving a first alert subscription request from a first software service, wherein the first alert subscription request indicates a first monitoring system for sending alerts; receiving a second alert subscription request from a second software service, wherein the second alert subscription request indicates a second monitoring for sending alerts; storing the first alert subscription request and a first set of keywords corresponding to the first software service; and storing the second alert subscription request and a second set of keywords corresponding to the second software service.

7. The method of any of the preceding embodiments, further comprising: determining, based on a comparison of the textual data and the first set of keywords, that a first anomaly of the one or more anomalies corresponds to the first software service; determining, based on a comparison of the textual data and the second set of keywords, that a second anomaly of the one or more anomalies corresponds to the second software service; in response to the determining that the first anomaly corresponds to the first software service, generating a first alert for the first monitoring system; in response to the determining that the second anomaly corresponds to the second software service, generating a second alert for the second monitoring system; and adding the first alert and the second alert to the one or more alerts.

8. A tangible, non-transitory, machine-readable medium storing data instructions that, when executed by a data processing apparatus, cause the data processing apparatus to perform operations comprising those of any of embodiments 1-7.

9. A system comprising: one or more processors; and memory storing instructions that, when executed by the processors, cause the processors to effectuate operations comprising those of any of embodiments 1-7.

10. A system comprising means for performing any of embodiments 1-7.

What is claimed is:

1. A system for identifying sentiments using messages, the system comprising:
one or more processors configured to execute computer program instructions that, when executed, cause the one or more processors to perform operations comprising:
generating a plurality of sentiment identifiers corresponding to a plurality of messages, wherein each message of the plurality of messages comprises a timestamp indicating when each message was published;
generating, for a first sentiment identifier of the plurality of sentiment identifiers, a timeseries dataset comprising a plurality of entries, wherein each entry of the plurality of entries comprises a corresponding timestamp and a corresponding degree of sentiment;
inputting the timeseries dataset into an anomaly detection model to determine one or more anomalies associated with the timeseries dataset, wherein the anomaly detection model has been trained to detect anomalies in the timeseries dataset; and
sending, onto a network, one or more alerts indicating the one or more anomalies.

2. The system of claim 1, wherein the computer program instructions further cause the one or more processors to determine whether each anomaly of the one or more anomalies is associated with one or more computing systems by performing operations comprising:
inputting, into a system detection model, message data extracted from a first message of the plurality of messages, wherein the first message is associated with a first timestamp of a first anomaly of the one or more anomalies; and
determining, based on output of the system detection model, a corresponding computing system associated with the first anomaly.

3. The system of claim 1, wherein the computer program instructions, when executed by the one or more processors, further cause the one or more processors to perform operations comprising:
generating a list of keywords from a first set of messages of the plurality of messages, wherein the first set of messages corresponds to a first anomaly of the one or more anomalies;
identifying, based on a comparison of the list of keywords with a list of application names, a first monitoring system of a plurality of monitoring systems; and
based on identifying the first monitoring system, sending a first alert of the one or more alerts to the first monitoring system.

4. The system of claim 1, wherein the computer program instructions further cause the one or more processors to send the one or more alerts to one or more monitoring systems associated with one or more computing systems by performing operations comprising:
sending, to a first monitoring system based on a first anomaly of the one or more anomalies, a command with textual data that is associated with the first anomaly, wherein the command causes the first monitoring system to perform operations comprising:
correlating the textual data with an alert generated by the first monitoring system; and
in response to correlating the textual data with the alert, modifying the alert to raise a priority level of the alert.

5. The system of claim 1, wherein the computer program instructions, when executed by the one or more processors, further cause the one or more processors to perform operations comprising:
receiving a first alert subscription request from a first software service, wherein the first alert subscription request indicates a first monitoring system for sending alerts;
receiving a second alert subscription request from a second software service, wherein the second alert subscription request indicates a second monitoring system for sending alerts;
storing the first alert subscription request and a first set of keywords corresponding to the first software service; and
storing the second alert subscription request and a second set of keywords corresponding to the second software service.

6. The system of claim 5, wherein the computer program instructions further cause the one or more processors to send the one or more alerts to one or more monitoring systems associated with one or more computing systems, by performing operations comprising:
determining, based on comparing first textual data associated with a first anomaly and the first set of keywords, that the first anomaly of the one or more anomalies corresponds to the first software service;
determining, based on comparing second textual data associated with a second anomaly and the second set of keywords, that the second anomaly of the one or more anomalies corresponds to the second software service;
in response to determining that the first anomaly corresponds to the first software service, generating a first alert for the first monitoring system;

in response to determining that the second anomaly corresponds to the second software service, generating a second alert for the second monitoring system; and adding the first alert and the second alert to the one or more alerts.

7. A method comprising:

generating a plurality of sentiment identifiers corresponding to a plurality of messages wherein each message of the plurality of messages comprises a timestamp indicating when each message was published;

generating, for a first sentiment identifier of the plurality of sentiment identifiers, a timeseries dataset comprising a plurality of entries, wherein each entry of the plurality of entries comprises a corresponding timestamp;

inputting the timeseries dataset into an anomaly detection model to determine one or more anomalies associated with the timeseries dataset, wherein the anomaly detection model has been trained to detect anomalies in the timeseries dataset; and sending, onto a network, a notification indicating the one or more anomalies.

8. The method of claim 7, further comprising determining whether each anomaly of the one or more anomalies is associated with an event by:

accessing a database that stores keywords corresponding to a plurality of events;

comparing textual data of one or more messages corresponding to a first anomaly of the one or more anomalies with the keywords corresponding to the plurality of events; and identifying, based on the comparing, a first event with one or more keywords matching the textual data of the one or more messages.

9. The method of claim 8, wherein sending the notification indicating the one or more anomalies comprises:

determining, based on first textual data of a first set of messages of the plurality of messages, a context corresponding to the first anomaly of the one or more anomalies; and sending a first notification to a communication system associated with the context, wherein the first anomaly is associated with a positive sentiment identifier.

10. The method of claim 7, further comprising determining whether each anomaly of the one or more anomalies is associated with an event by:

determining a first set of messages of the plurality of messages that correspond to a first anomaly of the one or more anomalies, wherein the first anomaly corresponds to a negative sentiment identifier; and determining, based on textual data of the first set of messages, an error and a monitoring system associated with the error;

wherein sending the notification indicating the one or more anomalies comprises sending an indication of the error to the monitoring system.

11. The method of claim 7, further comprising:

inputting, and into a system detection model for a first anomaly of the one or more anomalies, message data extracted from one or more messages of the plurality of messages, wherein each of the one or more messages is associated with a first timestamp of the first anomaly; and determining, based on output of the system detection model, a corresponding computing system associated with the first anomaly.

12. The method of claim 7, further comprising:

sending, based on a first anomaly of the one or more anomalies, a command with textual data to a first monitoring system, wherein the command causes the first monitoring system to perform operations comprising:

correlating the textual data with an alert generated by the first monitoring system; and in response to correlating the textual data with the alert, modifying the alert to raise a priority level of the alert.

13. The method of claim 7, further comprising:

receiving a first alert subscription request from a first software service, wherein the first alert subscription request indicates a first monitoring system for sending alerts;

receiving a second alert subscription request from a second software service, wherein the second alert subscription request indicates a second monitoring system for sending alerts;

storing the first alert subscription request and a first set of keywords corresponding to the first software service; and storing the second alert subscription request and a second set of keywords corresponding to the second software service.

14. The method of claim 13, further comprising:

determining, based on comparing a first message of the plurality of messages and the first set of keywords associated with a first anomaly, that the first anomaly of the one or more anomalies corresponds to the first software service;

determining, based on comparing the first message and the second set of keywords associated with a second anomaly, that the second anomaly of the one or more anomalies corresponds to the second software service;

in response to determining that the first anomaly corresponds to the first software service, generating a first alert for the first monitoring system;

in response to determining that the second anomaly corresponds to the second software service, generating a second alert for the second monitoring system; and adding the first alert and the second alert to the notification.

15. One or more non-transitory, machine-readable media storing instructions that when executed by one or more processors effectuate operations comprising:

generating a plurality of sentiment identifiers corresponding to a plurality of messages wherein each message of the plurality of messages comprises a timestamp indicating when each message was published;

generating, for a first sentiment identifier of the plurality of sentiment identifiers, a timeseries dataset comprising a plurality of entries, wherein each entry of the plurality of entries comprises a corresponding timestamp and a corresponding degree of sentiment;

inputting the timeseries dataset into an anomaly detection model to determine one or more anomalies associated with the timeseries dataset, wherein the anomaly detection model has been trained to detect anomalies in the timeseries dataset; and sending, onto a network, a notification indicating the one or more anomalies.

16. The one or more non-transitory, machine-readable media of claim 15, wherein the instructions further cause the one or more processors to determine whether each anomaly of the one or more anomalies is associated with an event by performing operations comprising:

accessing a database that stores keywords corresponding to a plurality of events;

comparing textual data of one or more messages corresponding to a first anomaly of the one or more anomalies with the keywords corresponding to the plurality of events; and identifying, based on comparing the textual data to the first anomaly, a first event with one or more keywords matching the textual data of the one or more messages.

17. The one or more non-transitory, machine-readable media of claim 15, wherein sending the notification indicating the one or more anomalies comprises:

determining, based on textual data of a first set of messages of the plurality of messages, a context corresponding to a first anomaly of the one or more anomalies; and sending a first notification corresponding to the first anomaly of the one or more anomalies to a communication system, wherein the first anomaly is associated with a positive sentiment identifier.

18. The one or more non-transitory, machine-readable media of claim 15, wherein the instructions further cause the one or more processors to determine whether each anomaly of the one or more anomalies is associated with an event by performing operations comprising:

determining a first set of messages of the plurality of messages that correspond to a first anomaly of the one or more anomalies, wherein the first anomaly corresponds to a negative sentiment identifier; and determining, based on textual data of the first set of messages, an error and a monitoring system associated with the error;

wherein sending the notification indicating the one or more anomalies and the event comprises sending an indication of the error to the monitoring system.

19. The one or more non-transitory, machine-readable media of claim 15, wherein the instructions, when executed by the one or more processors effectuate operations further comprising:

inputting, and into a system detection model for a first anomaly of the one or more anomalies, message data extracted from one or more messages of the plurality of messages, wherein each of the one or more messages is associated with a first timestamp of the first anomaly; and determining, based on output of the system detection model, a corresponding computing system associated with the first anomaly.

20. The one or more non-transitory, machine-readable media of claim 15, wherein the instructions, when executed by the one or more processors effectuate operations further comprising:

sending, to a first monitoring system based on a first anomaly of the one or more anomalies, a command with textual data, wherein the command causes the first monitoring system to perform:

correlating the textual data with an alert generated by the first monitoring system; and in response to correlating the textual data with the alert, modifying the alert to raise a priority level of the alert.

* * * * *